Jan. 12, 1943.   W. T. HANCOCK   2,308,172
METHOD OF REFINING AND TREATING CRACKED HYDROCARBONS
Filed April 1, 1940
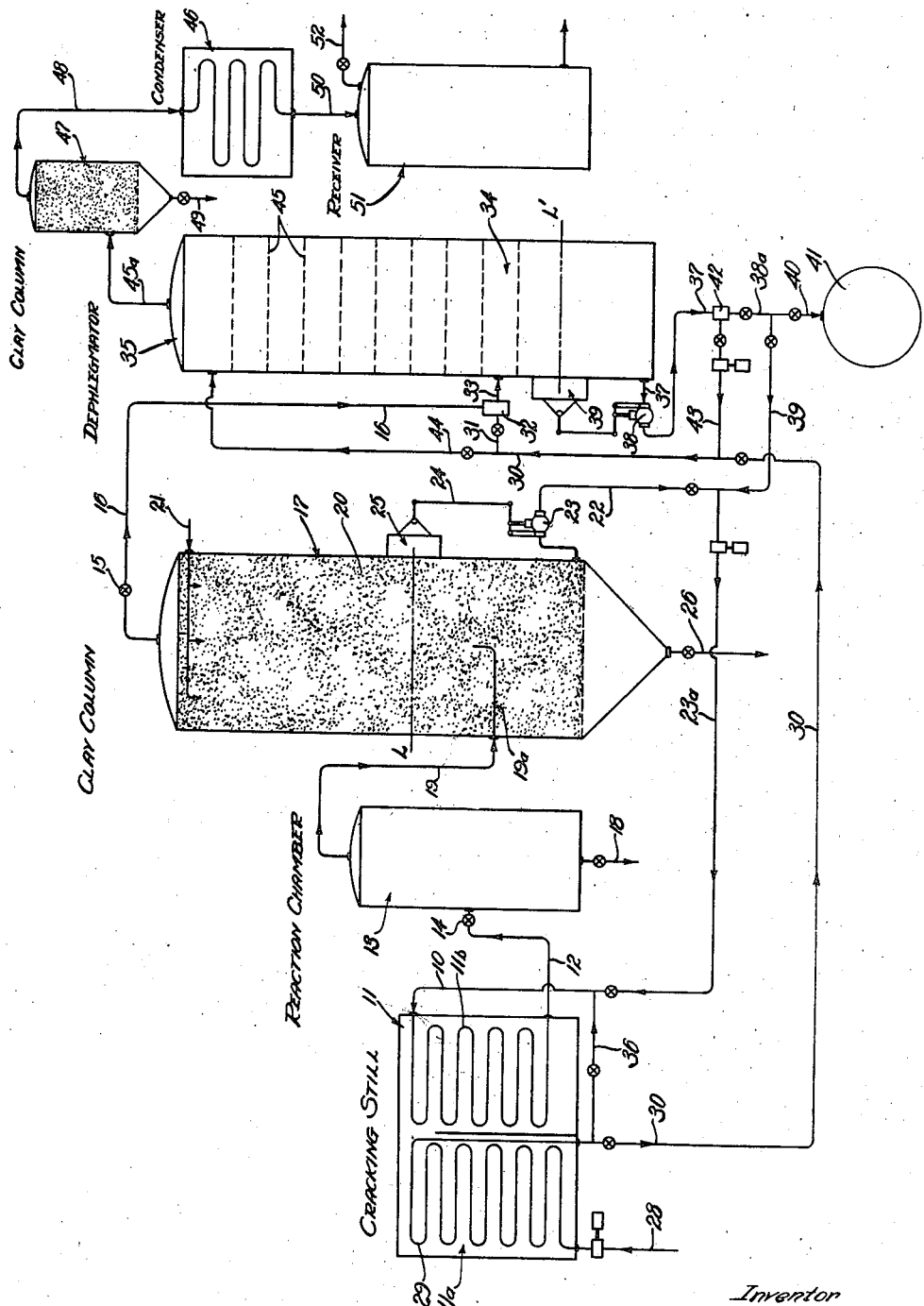
Inventor
WILLIAM T. HANCOCK
H. Calvin White
Attorney Patented Jan. 12, 1943

2,308,172

UNITED STATES PATENT OFFICE 2,308,172

METHOD OF REFINING AND TREATING CRACKED HYDROCARBONS

William T. Hancock, Long Beach, Calif.

Application April 1, 1940, Serial No. 327,197

8 Claims. (Cl. 196—96)

This invention relates to the refining of cracked petroleum oils, and has for its general object to provide a relatively simple system whereby the oil is subjected to cracking and vaporization, and the cracked vapors are treated in the same continuous process to produce gasoline abnormally low in gum-forming and sulphur-containing compounds. The invention may be more particularly characterized as involving polymerization of the cracked vapors, and treatment of the polymerized vapors by a method especially adaptable to the removal of impurities from hydrocarbons in polymerized condition.

In accordance with the invention, the charging stock is subjected to cracking and vaporization and the vapors polymerized by contacting them with adsorptive material such as fuller's earth, Muroc and Death Valley clays, and the like. Preferably I employ a cracking and polymerizing process of the general type disclosed in my copending application Serial Number 306,346, filed November 27, 1939, on System for cracking and polymerizing hydrocarbons, particularly because of the efficiency and adaptability of that polymerizing method to the present treating system. The particular object of the present invention is to provide for the treatment of the polymerized vapors in one continuous operation, by the general type of treating process described in Patent Number 2,162,715, issued to me on Process for refining cracked petroleum distillate.

After polymerization by passing through the adsorptive material, the vapors are discharged into an enlarged zone and are intimately admixed and partly condensed in advance of or within the enlarged zone, with a solvent oil having a substantially higher boiling range than the gasoline content of the vapors. In the broad aspects of the invention the solvent oil may be derived from any suitable source, and may consist wholly or in part of an independent oil, or of condensed higher boiling fractions of the vapors. According to one method of operation, a portion of the condensed heavy ends of the vapor may be removed from the enlarged zone and returned to the polymerized vapor stream, while another portion of the condensate is taken to storage or recirculated to the cracking zone. Instead of, or in addition to utilizing condensed heavy fractions of the vapors as a solvent medium, I preferably mix the vapors with a heated independent oil from some extraneous source, and separately remove the oil, together with impurities absorbed from the vapors, from the enlarged zone for further disposition. By this last method, it is advantageous to use preheated cracking stock as the solvent oil, and to pass the latter after absorption of impurities from the vapors, to the cracking zone and thereby subject the polymers and sulphur compounds to conversion, all as will later appear.

The features and objects of the invention referred to in the foregoing, as well as the operation of a typical refining system embodying the invention, will be understood more fully from the description to follow, and in which reference is had to the accompanying drawing illustrating the system diagrammatically and in flow sheet form.

A suitable charging stock, for example fuel oil taken from a straight run plant, is discharged through line 10 to the conventionally illustrated cracking still 11 in which the oil is subjected to cracking in coil 11b under the usual temperatures and pressures, for example at around 930° F. and in the neighborhood of 500 lbs. per sq. in. The cracked hydrocarbons are discharged from the cracking still through line 12 to a reaction and separating chamber 13 within which the hydrocarbons may be maintained under somewhat reduced pressure, say in the neighborhood of 250 lbs. per sq. in., by proper adjustment of valve 14 in line 12, and a back pressure valve beyond the reaction chamber, such as valve 15 in vapor line 16 leading from the clay column 17. Unvaporized residue, which may contain impurities absorbed from the polymerized vapors by the solvent oil, all as will hereinafter appear, is removed from the system through line 18 leading from the base of the reaction chamber. The cracked vapors flow from the reaction chamber through line 19 to the clay column 17 which contains a body of adsorptive material or clay 20 into which the vapors are introduced through pipe 19a.

While flowing upwardly through the adsorptive material, the vapors are subjected to intimate and repeated contact with condensed higher boiling fractions of the vapors, a sufficient percentage of which may be condensed to give the desired washing action within the clay, either by virtue of heat losses from the column or by a condensing medium such as gasoline or other reflux introduced through line 21. Provision may be made for maintaining more extensive washing of the vapors by condensed heavy ends, by placing in the condensate outlet line 22 a valve 23 operated through linkage 24 by conventionally illustrated float control 25, to maintain a body of the condensate within the lower portion of the clay body below level L. By introducing the vapors through line 19a into the body of condensate, the latter is caused to surge upwardly within the clay body with a percolating effect, and thereby subject the vapors and condensate to thorough and intimate contact within the clay. The polymerized hydrocarbons settling to the bottom of the clay column may be withdrawn with the condensate through the valved outlet line 26, although it is preferred to subject the polymers to reconversion by returning from the clay all or a substantial portion of the condensate column (which may correspond substantially to gas oil) through lines 22 and 23a to the cracking still 11.

The primary purpose of the clay column 17 is to subject the cracked vapors to polymerization, thereby removing a considerable percentage of gum-forming and other compounds that may be referred to generally as impurities, and also to increase the yield of recoverable gasoline, particularly where the polymers and condensate are recirculated from the clay column to the cracking still. It is desirable, however, that the cracked vapors leaving the clay column through line 16 be further treated in order to finally remove substantially all gum-forming compounds that may be carried over from the clay column, and also to reduce the sulphur compound content of the vapors prior to final condensation. For this purpose, the vapors are subjected to treatment with what may be termed generally a solvent oil, having a higher boiling range than the gasoline content of the vapors. The vapors are intimately admixed with the solvent oil and the treated vapors then separately withdrawn, leaving gum-forming and sulphur-containing impurities in the solvent oil.

It is preferred to use a solvent oil derived from an extraneous source, and advantageously to use the cracking still charging stock as the solvent oil whereby the absorbed impurities are subjected to reconversion and removed from the system in or as an incident of the cracking process. As illustrative, I show the fuel oil charging stock introduced to the system through line 28 to be pumped through a preheater coil 29 that may be contained in a preheating section 11a of the cracking still and heated by lower temperature gases flowing from the cracking coil. The charging stock may be preheated in coil 29 to a temperature ranging from 300° to 550° F. and discharged through lines 30 and 31 to a suitable mixer 32, wherein the solvent oil is intimately admixed with the cracked vapors being discharged from the clay column into the mixer through line 16. If desired, the mixer 32 may have sufficient volume to maintain the solvent oil and vapors in intimate contact therein over a period of several minutes, before the mixture is discharged through line 33 into an enlarged zone 34 within the lower portion of a dephlegmator 35, or other suitable chamber. All or a portion of the charging stock may thus be admixed with the cracked vapors, and preferably the quantity and temperature of the solvent oil so used will be regulated to cause, together with the condensing effect of the dephlegmator, condensation of vapor fractions heavier than gasoline. Where only a portion of the charging stock is employed as solvent oil, the remainder may be by-passed directly from the pre-heating coil 29 through lines 36 and 10 to the cracking still.

Upon entering the enlarged zone 34, the vapors separate from the solvent oil and condensed higher boiling fractions of the vapors, and the liquid oil collecting in the base of the dephlegmator is withdrawn through line 37 under control of a valve 38 operated by a suitable float control, diagrammatically illustrated at 39, which maintains the liquid at a suitable level L'. According to the preferred method of operation, the solvent oil leaving the dephlegmator through line 37 is discharged through lines 38a and 39 to be taken by way of line 23a to the cracking still 11 as charging stock. The latter will have remained sufficiently preheated, ordinarily at a temperature in excess of 300° F., for direct introduction to the cracking coil. The impurities absorbed from the vapors in the solvent oil are thus subjected to conversion in the cracking system, to produce recoverable gasoline fractions from the polymers and higher boiling ends condensed from the vapors. The returned sulphur compounds also undergo conversion and a substantial portion of the sulphur is removed from the system as hydrogen sulphide or other fixed gases in the cracking plant tail gases.

If for any reason it may not be preferred to pass all or part of the solvent oil from the dephlegmator to the cracking still, the oil may be taken from line 38a through pipe 40 to storage 41. In this case, the charging stock may be taken directly from the preheating coil 29 through line 36 to the cracking coil. Provision is made for maintaining a rate of solvent oil flow being mixed with the vapors, greater than the rate at which the oil is fed to the cracking still, by recirculating a portion of the solvent oil removed from the dephlegmator, back into contact with the vapors. Any desired portion of the solvent oil leaving the dephlegmator may be taken from line 37 at the proportioning valve 42 through line 43 and combined with the fresh solvent oil being fed to the mixer through pipe 30. The oil not being recirculated passes through line 38 to the cracking still, or to storage 41, depending upon the particular method of operation employed.

Although for most effective results it is desirable to subject the polymerized vapors to the action of a solvent oil independent of or in addition to the vapor condensate, it is found that purification of the vapors may be materially aided by contacting the vapors with condensate removed from the dephlegmator, independently of any additional oil. Accordingly, the vapors may be fractionally condensed by cooling in the dephlegmator, and a portion of the condensate recirculated through lines 43 and 30 to be mixed with the vapors in the mixing chamber 32, the rate (quantity) of condensate recirculation preferably being several times the rate at which the condensate is being produced. This is made possible, of course, by retaining or accumulating an excess amount of the condensate for recirculation.

Instead of contacting the solvent oil from line 30 with the vapors in mixer 32 and thus at a point in advance of the dephlegmator, the solvent oil may be introduced directly to the dephlegmator independently of the vapors and therein brought into intimate contact with the vapors. For example, the solvent oil may be discharged through line 44 into the upper interior of the dephlegmator and thereby caused to flow downwardly through the plates or trays 45 in intimate contact with the rising vapor stream. The solvent oil, together with absorbed impurities and condensed higher boiling fractions of the vapors, collects in the base of the dephlegmator, and is withdrawn for further disposition in accordance with the methods hereinabove described.

The vapors leaving the dephlegmator through line 45a may be passed directly to the condenser 46, or given a final treatment with adsorptive clay to remove traces of gum-forming compounds, by flowing the vapors through a clay column 47 and thence to the condenser through line 48. Polymers condensing in column 47 may be withdrawn through line 49. From the condenser 46, the product gasoline passes through line 50 to a receiver 51 provided with a valved outlet pipe 52 through which incondensible tail gases are discharged from the system.

I claim:

1. The method of refining petroleum oil that includes, subjecting the oil to cracking and vaporization, passing the cracked vapors through a stationary body of adsorptive material and thereby subjecting the vapors to polymerization, passing the polymerized vapors from said body into an enlarged zone, continuously removing from said enlarged zone condensed fractions of the vapors having a substantially higher boiling range than gasoline and admixing said removed fractions with the polymerized vapors from said adsorptive material to produce said condensed higher boiling fractions in the enlarged zone, said condensed vapor fractions being prevented from contacting the adsorptive material, and separately removing and condensing the vapors from said enlarged zone to produce gasoline.

2. The method of refining petroleum oil that includes, subjecting the oil to cracking and vaporization, passing the cracked vapors through a stationary body of adsorptive material and thereby subjecting the vapors to polymerization, passing the polymerized vapors from said body into an enlarged zone, continuously removing from said enlarged zone condensed fractions of the vapors having a substantially higher boiling range than gasoline and admixing said removed fractions with the polymerized vapors from said adsorptive material before they enter said enlarged zone, to produce said condensed higher boiling fractions in the enlarged zone, said condensed vapor fractions being prevented from contacting the adsorptive material, and separately removing and condensing the vapors from said enlarged zone to produce gasoline.

3. The method of refining petroleum oil that includes, subjecting the oil to cracking and vaporization, passing the cracked vapors through a stationary body of adsorptive material and thereby subjecting the vapors to polymerization, passing the polymerized vapors from said body into an enlarged zone, continuously removing from the lower interior of said enlarged zone condensed fractions of the vapors having a substantially higher boiling range than gasoline, returning said removed fractions to the upper interior of said enlarged zone in intimate contact with the vapors to produce partial condensation of the vapors, said condensed vapor fractions being prevented from contacting the adsorptive material, and separately removing and condensing the vapors from said enlarged zone to produce gasoline.

4. The method of refining petroleum oil that includes, subjecting the oil to cracking and vaporization in a cracking zone, passing the cracked vapors through a stationary body of adsorptive material and thereby subjecting the vapors to polymerization, passing the polymerized vapors from said body into an enlarged zone, admixing with said polymerized vapors a solvent oil taken from an extraneous source and having a substantially higher boiling range than gasoline, thereby absorbing impurities from the vapors in said solvent oil, said solvent oil being prevented from contacting the adsorptive material, removing the solvent oil from said zone and admixing a portion of the removed oil with the polymerized vapors from said adsorptive material to produce condensed higher boiling fractions of the vapors in said enlarged zone, and separately removing and condensing the vapors from said enlarged zone to produce gasoline.

5. The method of refining petroleum oil that includes, subjecting the oil to cracking and vaporization in a cracking zone, passing the cracked vapors through a stationary body of adsorptive material and thereby subjecting the vapors to polymerization, passing the polymerized vapors from said body into an enlarged zone, admixing with said polymerized vapors a solvent oil taken from an extraneous source and having a substantially higher boiling range than gasoline, thereby absorbing impurities from the vapors in said solvent oil, removing the solvent oil from said zone and admixing a portion of the removed oil with the polymerized vapors from said adsorptive material to produce condensed higher boiling fractions of the vapors in said enlarged zone, delivering another portion of the removed oil to said cracking zone, and separately removing and condensing the vapors from said enlarged zone to produce gasoline.

6. The method of refining petroleum oil that includes, subjecting the oil to cracking and vaporization, passing the cracked vapors through a body of adsorptive material and thereby subjecting the vapors to polymerization, maintaining the vapors during their passage through said material in intimate contact with condensed fractions of the vapors to increase the formation and removal of polymerizable impurities from the vapors, passing the polymerized vapors from said body into an enlarged zone, admixing with said polymerized vapors a solvent oil having a substantially higher boiling range than gasoline and thereby absorbing additional impurities from the vapors in said solvent oil, said solvent oil being prevented from contacting the adsorptive material, removing the solvent oil from said zone and mixing at least a portion of the removed solvent oil with said polymerized vapors, and separately removing and condensing the vapors to produce gasoline.

7. The method of refining petroleum oil that includes, subjecting the oil to cracking and vaporization in a cracking zone, passing the cracked vapors through a body of adsorptive material and thereby subjecting the vapors to polymerization, maintaining the vapors during their passage through said material in intimate contact with a considerably large quantity of condensed fractions of the vapors to increase the formation and removal of polymerizable impurities from the vapors, returning said condensed fractions from said body to the cracking zone, passing the polymerized vapors from said body into an enlarged zone, admixing with said polymerized vapors a solvent oil having a substantially higher boiling range than gasoline and thereby absorbing additional impurities from the vapors in said solvent oil, said solvent oil being prevented from contacting the adsorptive material, removing the solvent oil from said zone and mixing at least a portion of the removed solvent oil with said polymerized vapors, and separately removing and condensing the vapors to produce gasoline.

8. The method of refining petroleum oil that includes, subjecting the oil to cracking and vaporization in a cracking zone, passing the cracked vapors through a body of adsorptive material and thereby subjecting the vapors to polymerization, maintaining the vapors during their passage through said material in intimate contact with a considerably large quantity of condensed fractions of the vapors, passing the polymerized vapors from said body into an enlarged zone, admixing with said polymerized vapors a solvent oil taken from an extraneous source and having a substantially higher boiling range than gasoline, thereby absorbing impurities from the vapors in said solvent oil, said solvent oil being prevented from contacting the adsorptive material, removing the solvent oil from said zone and delivering one portion of the removed solvent oil to said cracking zone and mixing another portion with said polymerized vapors, and separately removing and condensing the vapors from said enlarged zone to produce gasoline.

WILLIAM T. HANCOCK.